United States Patent
Andgart et al.

(10) Patent No.: US 8,582,698 B2
(45) Date of Patent: Nov. 12, 2013

(54) REDUCED COMPLEXITY TIMING ESTIMATION FOR LOCATING THE POSITION OF A MOBILE TERMINAL

(75) Inventors: Niklas Andgart, Södra Sandby (SE); Joakim Axmon, Kävlinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 12/776,637

(22) Filed: May 10, 2010

(65) Prior Publication Data

US 2011/0274220 A1 Nov. 10, 2011

(51) Int. Cl.
*H04L 27/06* (2006.01)
(52) U.S. Cl.
USPC ........... 375/342; 375/260; 375/267; 375/340; 342/108; 342/357.2; 455/404.2; 455/456.1
(58) Field of Classification Search
USPC .................. 375/260, 267, 340, 342, 347; 455/404.2, 456.1; 342/357.2, 357.21, 342/357.25, 357.26, 357.46, 357.47; 701/207, 213
See application file for complete search history.

(56) References Cited

U.S. PATENT DOCUMENTS

| | | | |
|---|---|---|---|
| 6,208,297 B1 | 3/2001 | Fattouche et al. | |
| 6,771,591 B1 * | 8/2004 | Belotserkovsky et al. | ... 370/210 |
| 7,308,022 B2 | 12/2007 | Rick et al. | |
| 7,558,345 B2 * | 7/2009 | Kim et al. | 375/343 |
| 7,630,432 B2 * | 12/2009 | Hofmeister | 375/232 |
| 7,965,230 B2 * | 6/2011 | Pon | 342/357.25 |
| 8,295,311 B2 * | 10/2012 | Guey | 370/509 |
| 2003/0119510 A1 * | 6/2003 | Song | 455/436 |
| 2004/0057374 A1 * | 3/2004 | Bott et al. | 370/206 |
| 2006/0050625 A1 | 3/2006 | Krasner | |
| 2007/0076589 A1 | 4/2007 | Stopler et al. | |
| 2009/0046671 A1 | 2/2009 | Luo | |
| 2009/0154607 A1 | 6/2009 | Lindoff et al. | |
| 2010/0020850 A1 | 1/2010 | Navarro Rodero et al. | |
| 2010/0290569 A1 * | 11/2010 | Bury | 375/343 |

FOREIGN PATENT DOCUMENTS

WO 2006/099240 A1 9/2006

OTHER PUBLICATIONS

C. Mensing, et al., "Data-Aided Location Estimation in Cellular OFDM Communications Systems," Proceedings of the IEEE Global Communications Conference (GLOBECOM), Honolulu, HI, USA, Nov./Dec. 2009, 7 pages.

* cited by examiner

*Primary Examiner* — Sophia Vlahos
(74) *Attorney, Agent, or Firm* — Coats and Bennett, P.L.L.C.

(57) ABSTRACT

A method and corresponding apparatus are provided to reduce the complexity of calculations needed to determine the time of arrival of position reference signals transmitted from multiple cells. A scheduler determines at a given instance what portions of a search grid or search window to search. A timing estimation circuit operating under the control of the scheduler computes timing estimates and reports the timing estimates back to the scheduler. The scheduler uses the timing estimates reported by the detection circuit to scheduler subsequent searches of the search grid or search window.

22 Claims, 12 Drawing Sheets

REDUCED COMPLEXITY TIMING ESTIMATION FOR LOCATING THE POSITION OF A MOBILE TERMINAL

BACKGROUND

The present invention relates generally to location detection for mobile terminals using the observed time difference of arrival method, and more particularly, to a reduced complexity approach for obtaining timing estimates needed for position calculations.

In modern mobile communication networks, there is frequently a need to determine the location of a mobile terminal. Many network operators offer location based services to their subscribers to provide information based on the subscriber's current location (e.g., nearest restaurants, gas stations, etc.). Also, federal regulations require mobile operators to determine the location of persons placing emergency calls. Location tracking systems also use wireless devices to track the location of vehicles, such as cars and trucks for fleet operators. Therefore, reliable methods are needed for determining the current position or location of mobile devices.

One location method being proposed for Long Term Evolution (LTE) systems is observed time difference of arrival (OTDOA). The location of a mobile terminal can be determined by measuring the time difference of arrival of a signal transmitted from three or more synchronized cells. To facilitate OTDOA measurements in LTE, a set of reference signals referred to as positioning reference signals (PRS) are transmitted by the cells during a positioning occasion. Positioning occasions typically occur once every 160-1280 subframes (160-1280 ms). Each positioning occasion comprises up to 6 consecutive positioning subframes. The mobile terminal measures the arrival times of the position reference signals from different cells and reports these observed times to the network. Measurements may be performed for up to 18 different cells, at a distance of up to 240 kilometers.

The position reference signals will be received with varying signal-to-interference ratios and with varying time delays. In some instances, assistance information may be provided by the network to narrow the time span in which signals from a particular cell are expected. The accuracy of the assistance information may vary greatly from ±30 meters up to ±120 kilometers. Thus, the search window for detecting the position reference signals is approximately 0.2 microseconds for the best case scenario and approximately 0.8 milliseconds for the worst case scenario. The large expected differences in arrival times, the potentially low accuracy of the assistance information, and the large number of measured cells increases the processing and memory requirements. One way to reduce the number of calculations to be performed is to divide the cells into groups and to perform the calculations one group at a time. Even with this approach, the complexity of the calculations is significant. Therefore, there is interest in new approaches that reduce the complexity of TOA calculations.

SUMMARY

The present invention reduces the complexity of calculations needed to determine the time of arrival of position reference signals transmitted from multiple cells. A scheduler determines at a given instance what portions of a search grid or search window to search. A detection circuit operating under the control of the scheduler computes timing estimates and reports the timing estimates back to the scheduler. The scheduler uses the timing estimates reported by the detection circuit to schedule subsequent searches of the search grid or search window.

One exemplary embodiment of the invention comprises a method of estimating the arrival time of received reference signals from two or more cells. One exemplary method comprises scheduling, by a scheduler, a first set of timing hypotheses spanning one or more OFDM symbols for one or more cells; detecting, by a detector, reference signals corresponding to the timing hypotheses; computing, by said detector, timing estimates based on said detected reference signals; reporting, by said detector, said timing estimates for the detected reference signals to said scheduler; and scheduling a second set of timing hypotheses based on the reported timing of the reference signals.

Another exemplary embodiment of the invention comprises a timing estimation circuit for estimating the arrival times of position reference signals from multiple cells. The timing estimation circuit according to one embodiment comprises a detection circuit and a scheduler. The detection circuit is configured to detect reference signals corresponding to a first set of timing hypotheses provided by a scheduler; compute timing estimates based on said detected reference signals; and report said timing estimates for the detected reference signals to said scheduler. The scheduler is configured to schedule a first set of timing hypotheses spanning one or more OFDM symbols for one or more cells to be processed by said detection circuit; and schedule a second set of timing hypotheses to be processed by said detection circuit based on said reported timing estimates provided by said detection circuit.

DETAILED DESCRIPTION

Figure 1:
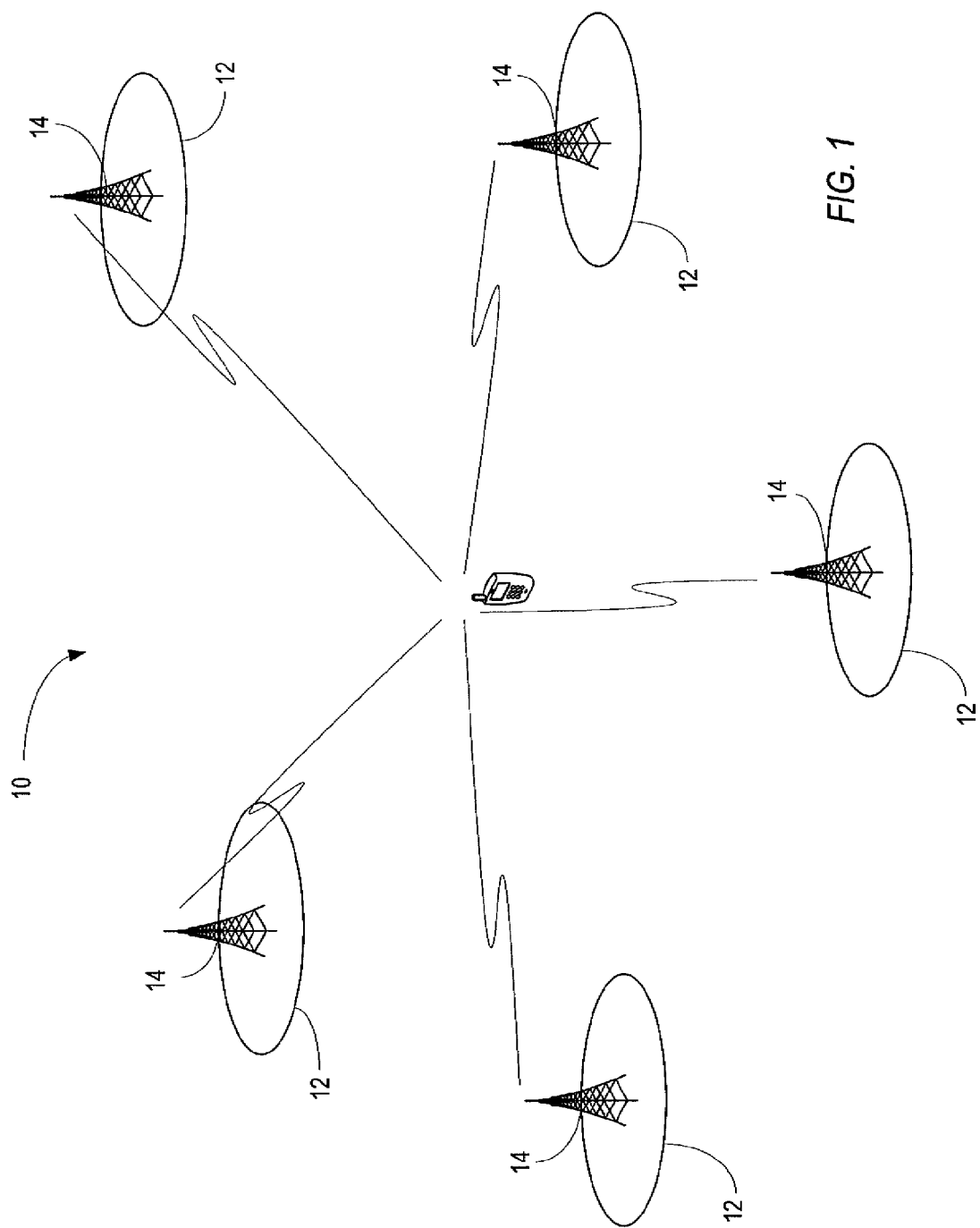
FIG. 1 illustrates an exemplary mobile communication network.

Referring now to the drawings, FIG. 1 illustrates an exemplary mobile communication network 10. The geographic area covered by the network 10 is divided into a plurality of cells 12. A base station 14 in each cell communicates with mobile terminals 100 within the cell 12. In the exemplary embodiment described herein, the mobile communication network operates in accordance with the Long-Term Evolution (LTE) standard. Those skilled in the art will appreciate that the present invention is not limited to use in LTE networks, but may also be applied in other networks that employ orthogonal frequency division multiplexing (OFDM), such as WiMax networks and wireless local area networks (WLANs).

The LTE standard supports location services by providing a mechanism for determining the current location of a mobile terminal 100. One method used in LTE systems for determining location of a mobile terminal 100 is the observed time difference of arrival (OTDOA) method. The base stations 14 in three or more cells 12 transmit position reference signals (PRSs) to the mobile terminal 100. The PRSs are transmitted by each of the base stations 14 during a designated positioning occasion. Positioning occasions typically occur once every 160-1280 subframes (160-1280 ms). Each positioning occasion comprises up to 6 consecutive positioning sub-frames. The position reference signals are typically transmitted once in every 6-14 sub-frames. The mobile terminal 100 measures the arrival times of the position reference signals from different cells 12, and reports the time measurements to the network. A location server in the network can then use the time measurements to determine the location of the mobile terminal 100.

Figure 2:
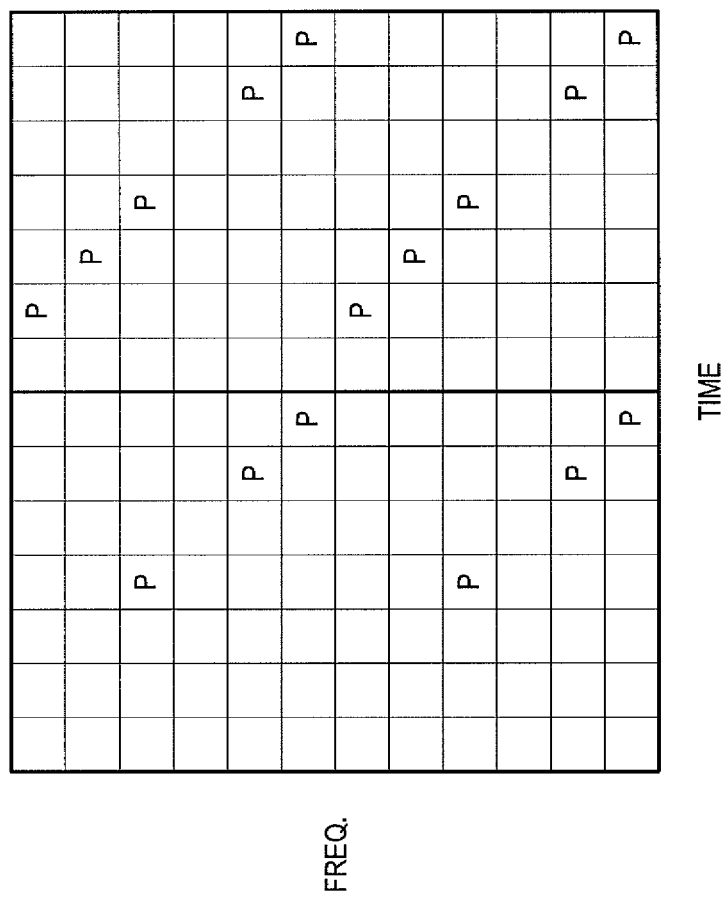
FIG. 2 illustrates position reference signals in a resource block in an OFDM subframe for determining location of a mobile terminal.

FIG. 2 illustrates one resource block of an OFDM sub-frame containing position reference signals. The columns in the resource block correspond to OFDM symbols and the rows correspond to sub-carriers. A typical resource block comprises 14 symbols and 12 sub-carriers. The locations of the position reference signals in the resource block are specified by the LTE standard. Resource elements containing position reference signals include the letter P. Those skilled in the art will appreciate that, while the LTE standard uses specially designated position reference signal for location estimation, the present invention may use any known signal as a position reference signal. For example, pilot symbols or known data sequences may be used as position reference signals.

Figures 3, 4:
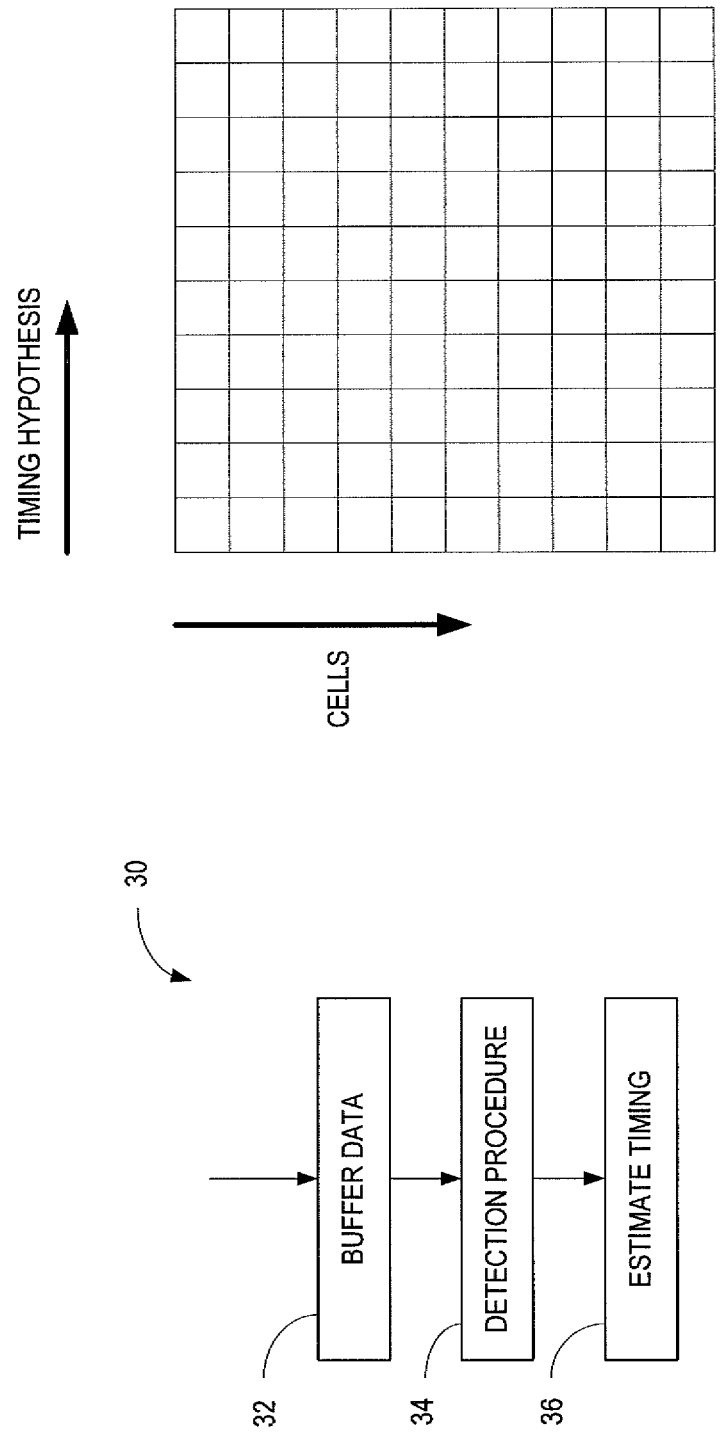
FIG. 3 illustrates an exemplary method of computing arrival time of position reference signals.
FIG. 4 illustrates an exemplary search grid for detecting position reference signals.

FIG. 3 illustrates an exemplary process 30 implemented by the mobile terminal 100 for computing the time of arrival of the position reference signals. Data received from multiple cells is stored in a data buffer (block 32). The data in the data buffer spans multiple OFDM symbols. Because the propagation time of the position reference signals from different cells 12 will be different, the mobile terminal 12 does not know precisely where the position reference signals are in the buffer data. The mobile terminal 100 processes the data stored in the buffer to detect the position reference signals (block 34). When the position reference signals are found, the mobile terminal 100 computes the arrival time of the position reference signals and reports the arrival times to the location server in the network (block 36).

Because the mobile terminal 100 may perform measurements for up to 18 different cells 12, the number of computations needed to be performed to detect the position reference signals may get quite large. Referring to FIG. 4, the data being searched may be represented by a search grid. The rows in the search grid represent different cells 12 and the columns represent different OFDM symbols. Thus, a cell in the search grid represents one OFDM symbol transmitted by one cell. Typically, mobile terminals 100 have limited processing and memory resources. Because the mobile terminal 100 cannot simultaneously search all of the received data from all of the cells 12, a scheduler is introduced to manage the search process. The scheduler determines what portion of the search grid to search at a given time. One aspect of the invention is to use the results of an earlier search for scheduling subsequent searches.

Figure 5:
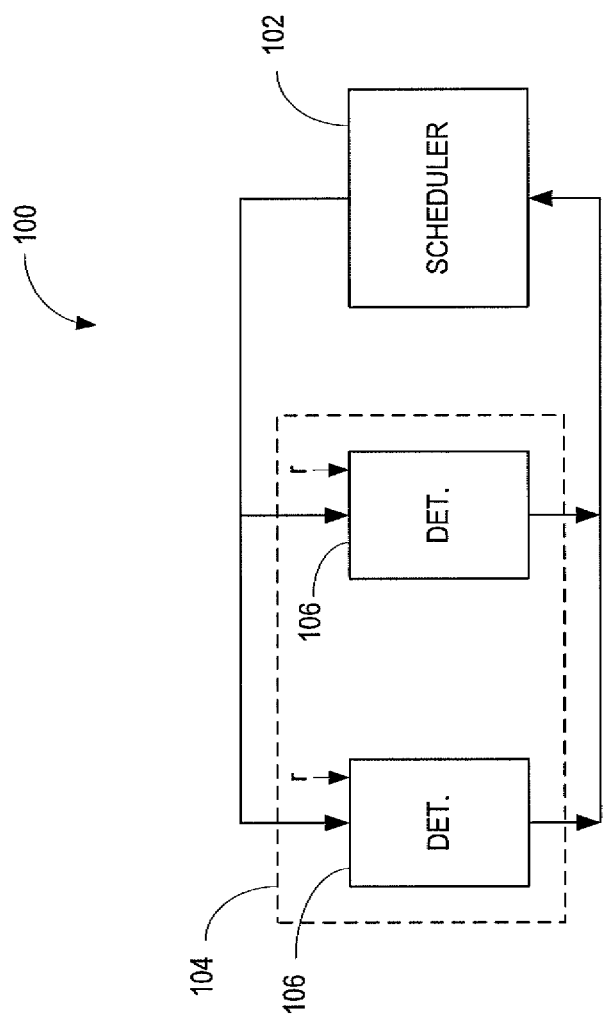
FIG. 5 illustrates an exemplary timing estimation circuit for computing the time of arrival of position reference signals.

FIG. 5 illustrates an exemplary timing estimation circuit 100 according to one embodiment of the invention. The timing estimation circuit 100 comprises a scheduler 102 and a detection circuit 104. The scheduler 102 schedules a set of hypotheses corresponding to cells of the search grid to be searched. The set of hypotheses are input to the detection circuit 104. In this exemplary embodiment, the detection circuit 104 comprises a plurality of detectors 106 capable of processing multiple hypotheses in parallel. The detection circuit 106 detects position reference signals corresponding to each hypothesis and estimates the time of arrival based on the detected position reference signals. The scheduler 102 uses the results of the search to schedule a second set of hypotheses. For example, the scheduler may generate a hypothesis corresponding to a previously detected peak.

The hypotheses according to one embodiment are spaced one symbol apart. However, those skilled in the art will readily appreciate that the spacing between hypotheses can be longer or shorter than one symbol. Spacing the hypotheses closer together results in greater accuracy at the cost of increased number of hypotheses and greater complexity.

Figure 6:
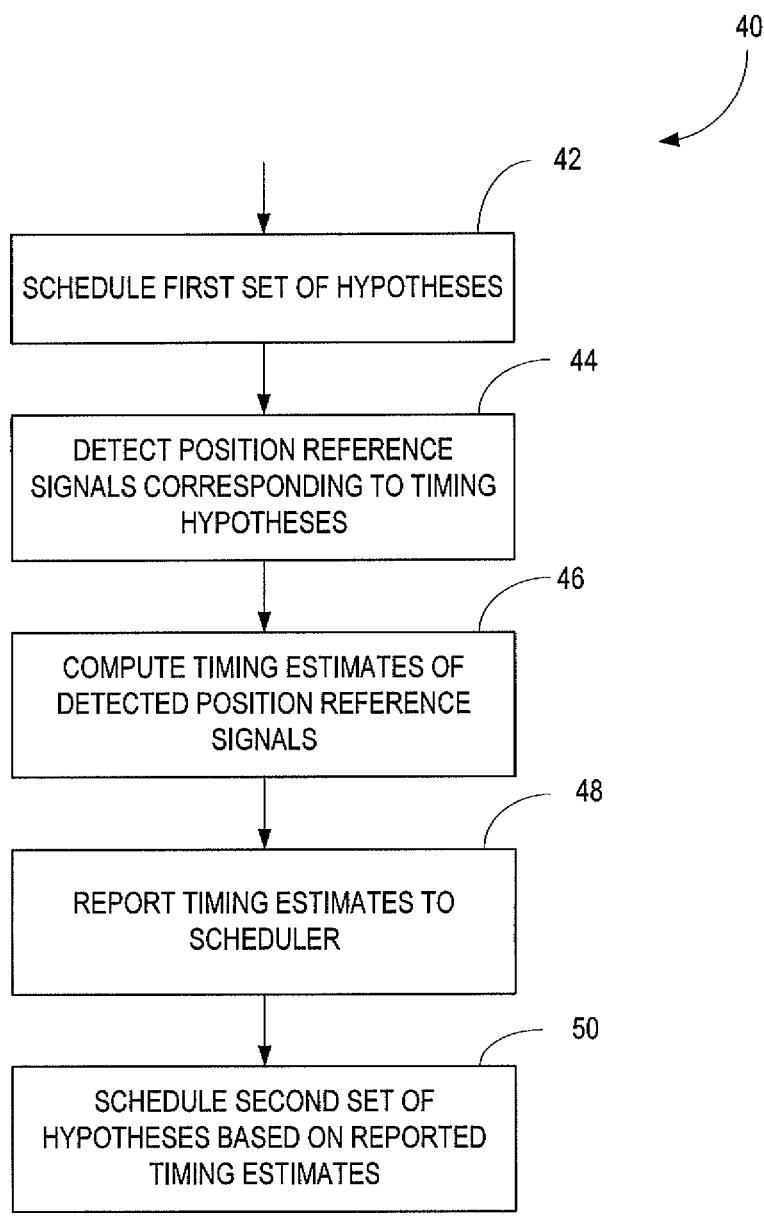
FIG. 6 illustrates an exemplary method of computing arrival time of position reference signals.

FIG. 6 illustrates an exemplary method 40 for detecting position reference signals and computing timing estimates according to one embodiment of the present invention. At the start of the search process, the scheduler 102 does not know which search grid cells contain the position reference signals. The scheduler 102 generates a first set of hypotheses (block 42) representing a sub-set of the cells in the search grid. The detection circuit 104 performs a search based on the first set of hypotheses to detect position reference signals, if any, corresponding to the hypotheses (block 44), computes timing estimates based on the detected position reference signals (block 46), and reports the position reference signals back to the scheduler 102 (block 48). The scheduler 102 uses the results of earlier searches to schedule a second set of hypotheses (block 50). It may be noted that the second set of hypotheses may include cells previously searched that were found to contain position reference signals, along with cells that have yet to be searched. Thus, some of the processing resources may be used to track position reference signals located in prior searches while the remaining resources are used to search for additional position reference signals.

Figure 7A:
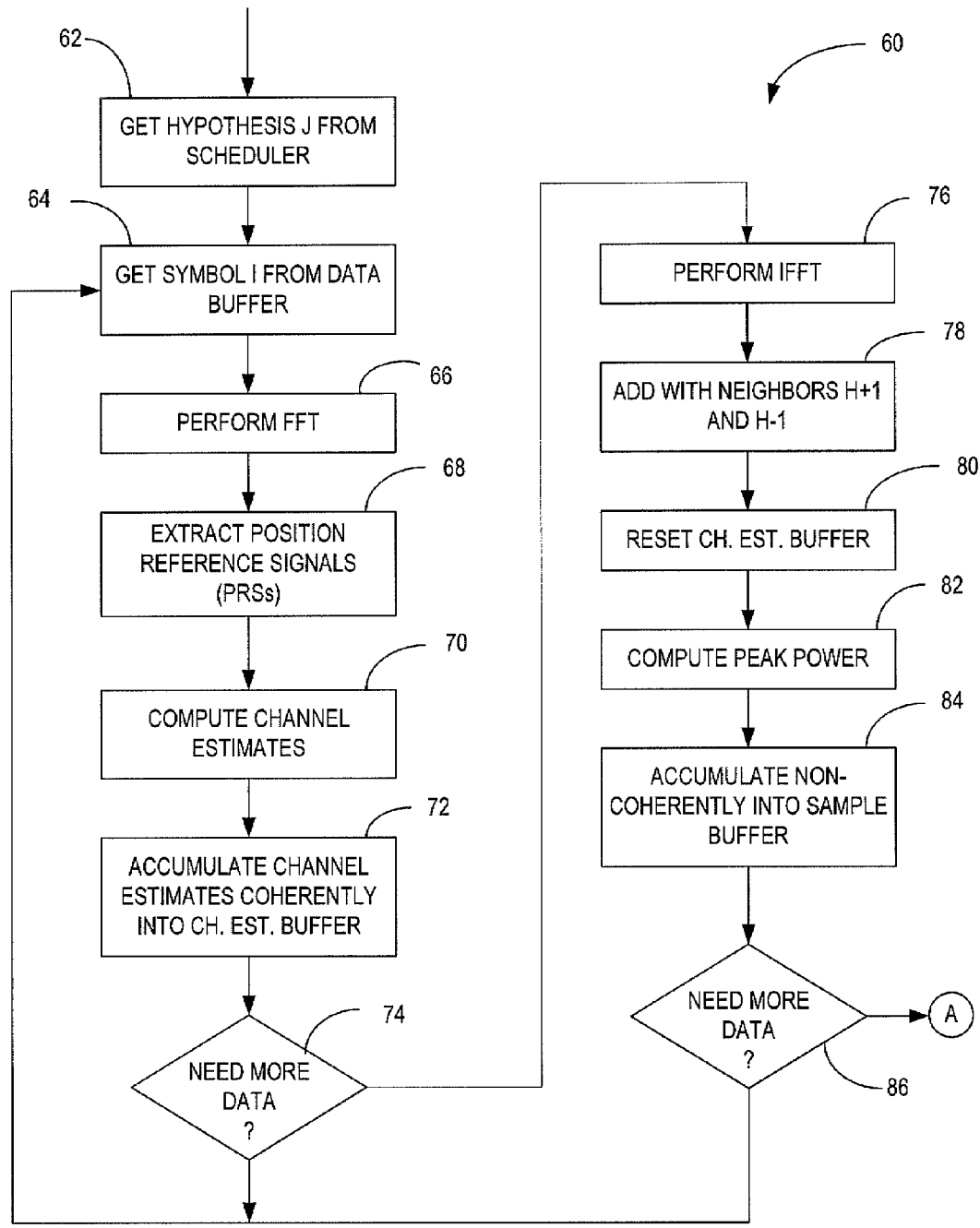
FIGS. 7A and 7B illustrate an exemplary method for computing timing estimates in one embodiment of the invention.
Figure 7B:
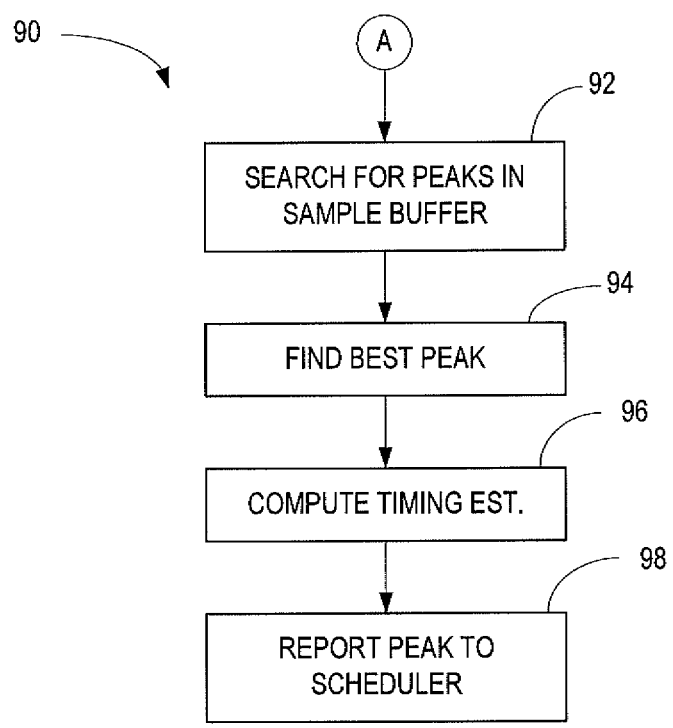

FIGS. 7A and 7B illustrate an exemplary detection procedure 60 implemented by the detection circuit 104 for detecting position reference signals. At the start of the detection procedure 60, the detection circuit 104 gets a timing hypothesis h from the scheduler (block 62). The detection circuit 104 reads symbol i from the data buffer (block 64) and performs a Fast Fourier transform (FFT) to convert the OFDM symbol I from the time domain to the frequency domain (block 66). In the frequency domain, the detection circuit 104 can extract the signals from the sub-carriers that would contain the position reference signals if the timing hypothesis is correct (block 68). The signals extracted from the selected sub-carriers are then multiplied by the conjugate of the position reference signals to obtain channel estimates (block 70). The channel estimates are accumulated in a channel estimate buffer (block 72) and the process is repeated (block 74) until a sufficient number of channel estimates are obtained.

The channel estimates in the channel estimate buffer form a channel estimate vector. The detection circuit 104 performs an inverse FFT (IFFT) on the channel estimate vector to obtain a channel impulse response (block 76). As described in more detail below, the detection circuit 104 may optionally filter the channel impulse response for the timing hypothesis h by combining the channel impulse response for hypotheses h with neighboring hypotheses h+1 and h−1 to obtain a filtered channel impulse response (block 78). When adding neighbor hypotheses together, the spacing between hypotheses should be taken into account so that peaks will be time aligned. After the channel impulse response is computed, the channel estimate buffer is reset (block 80). The detection circuit 104 computes a power estimate for each sample in the channel impulse response (block 82) and accumulates the power estimates non-coherently into a sample buffer (block 84). The detection circuit 104 then determines whether more data is needed (block 86). If so, processing returns to block 64 and another symbol is retrieved from the data buffer. The power estimates computed in each subsequent iteration are non-coherently summed with the power estimates already in the sample buffer. At the end of the search process, the sample buffer contains cumulative power estimates corresponding to each sample in the channel impulse response. The position reference signal will appear as peaks in the channel impulse response.

Referring to FIG. 7B, the detector 106 searches for peaks in the sample buffer (block 92) and finds the "best" peaks (block 94). In this context, "best" means the peak with the maximum power. It is presumed that the peaks with the maximum power correspond to the position reference signals. In some cases, the true peak in the channel impulse response may lie between two samples. In this case, the "best" peak may be determined by interpolation. The detector 106 then computes the timing of the "best" peak (block 96) and reports the peak/timing estimate to the scheduler (block 98). Alternatively, the detector 106 may compute the phase slope of the channel impulse response and estimate the timing based on the phase slope.

Figure 8:
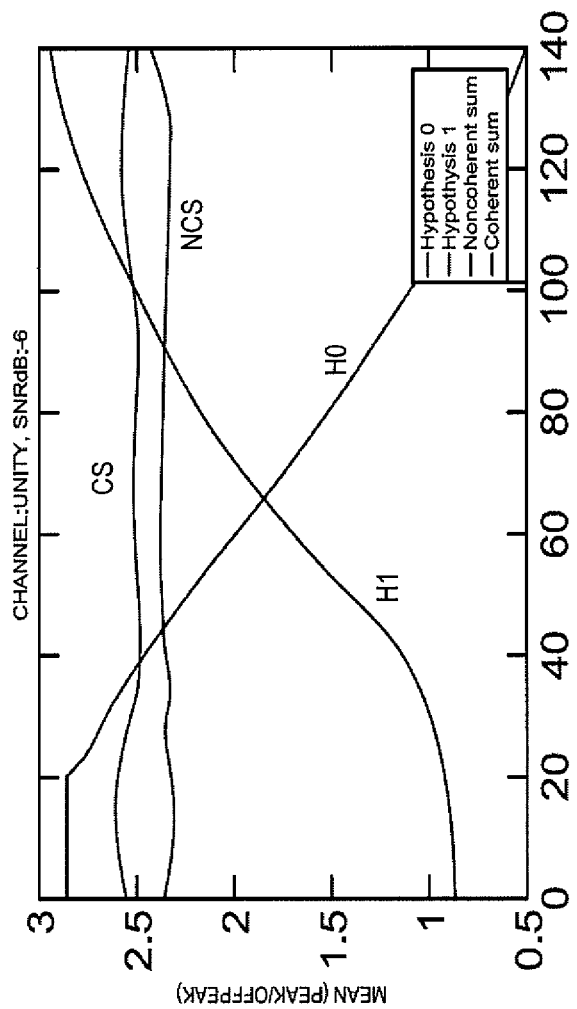
FIG. 8 is a graph of the peak to off peak power ratio of a typical channel impulse response as a function of delay.

In the exemplary procedure shown in FIGS. 7A and 7B, the channel impulse response for a given hypothesis h is optionally added to the channel impulse response for neighboring hypotheses h+1 and h−1 (see block 78). The reason for adding the channel impulse response for one hypothesis with the channel impulse response for a neighbor hypothesis will be explained with reference to FIG. 8. FIG. 8 is a graph illustrating the peak to off-peak ratio typical for a channel impulse response as a function of delay. The ratio should be high for good performance. With a value close to or below 1, the position reference signals may not be detected.

The line marked H0 in FIG. 8 shows the peak/off-peak ratio as a function of delay for a first hypothesis. The graph shows that the performance drops with increasing delay. The line marked H1 shows performance for a second hypothesis spaced one symbol away from the first hypothesis H1. It may be noted that performance is worst at the mid-point between hypothesis H0 and H1. The worst case scenario can be improved by coherently or non-coherently summing the channel impulse response from two or more hypotheses. Summing the channel impulse response from adjacent hypotheses generates a generally flat peak/off-peak ratio, which improves detection in the worst case scenario.

Figure 9A:
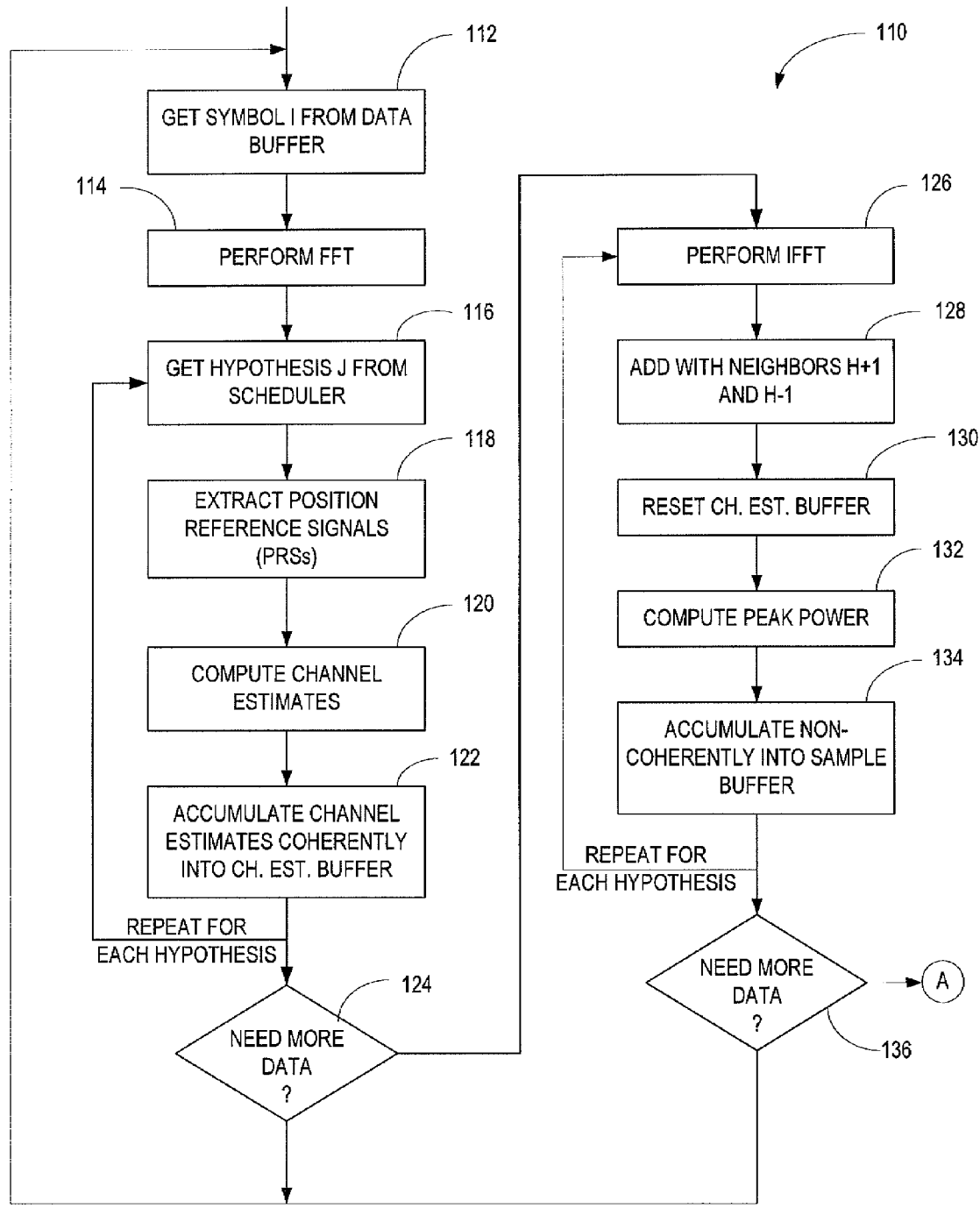
FIGS. 9A and 9B illustrate an exemplary method for computing timing estimates in another embodiment of the invention.
Figure 9B:
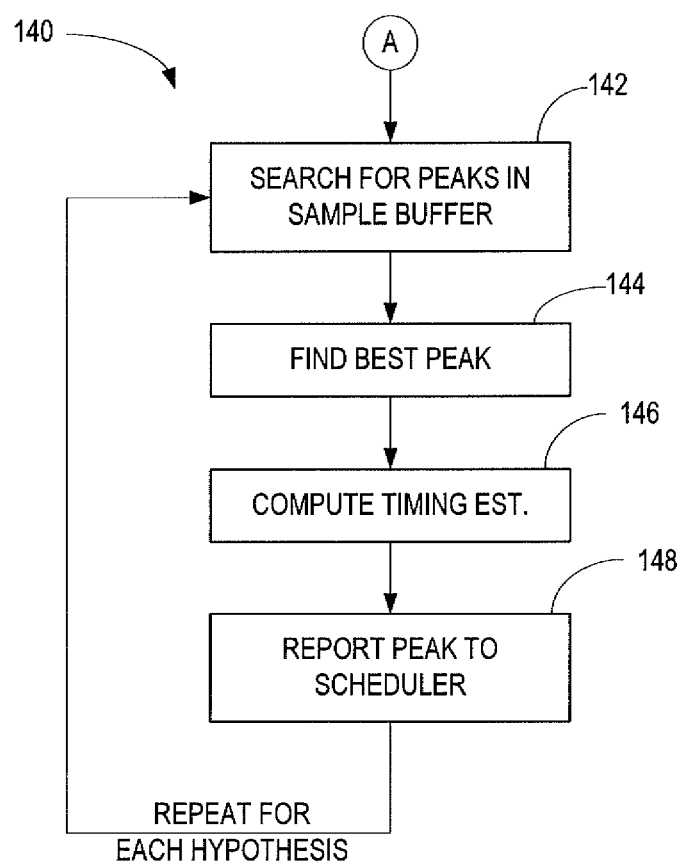

FIGS. 9A and 9B illustrate an exemplary detection procedure 60 implemented by the detection circuit 104 for detecting position reference signals according to a second embodiment. The procedure shown in FIGS. 9A and 9B is essentially the same as previously described, except that the FFT is initially performed for all hypotheses. At the start of the detection procedure 110, the detection circuit 104 gets a symbol i from the data buffer (block 112) and performs an FFT to convert the OFDM symbol i from the time domain to the frequency domain (block 114). The detector 104 then gets a timing hypothesis h from the scheduler (block 116). The detection circuit 104 can extract the signals from the sub-carriers that would contain the position reference signals if the timing hypothesis is correct (block 118). The signals extracted from the selected sub-carriers are then multiplied by the conjugate of the position reference signals to obtain channel estimates (block 120). The channel estimates are accumulated in a channel estimate buffer (block 122) and the process is repeated for each hypothesis. The detection circuit 104 then determines whether more data is needed (block 124). If so, processing returns to block 112 and another symbol is retrieved from the data buffer.

The channel estimates in the channel estimate buffer form a channel estimate vector. The detection circuit 104 performs an inverse FFT (IFFT) on the channel estimate vector to obtain a channel impulse response (block 126). As previously described, the detection circuit 104 may optionally filter the channel impulse response for the timing hypothesis h by combining the channel impulse response for hypotheses h with neighboring hypotheses h+1 and h−1 to obtain a filtered channel impulse response (block 128). When adding neighbor hypotheses together, the spacing between hypotheses should be taken into account so that peaks will be time aligned. After the channel impulse response is computed, the channel estimate buffer is reset (block 130). The detection circuit 104 computes a power estimate for each sample in the channel impulse response (block 132) and accumulates the power estimates non-coherently into a sample buffer (block 134). The accumulation is repeated for each hypothesis. The detection circuit 104 then determines whether more data is needed (block 136). If so, processing returns to block 112 and another symbol is retrieved from the data buffer. At the end of the search process, the sample buffer contains cumulative power estimates corresponding to each sample in the channel impulse response. The position reference signal will appear as peaks in the channel impulse response.

Referring to FIG. 9B, the detection circuit 104 searches for peaks in the sample buffer (block 142) and finds the "best" peaks (block 144). In this context, "best" means the peak with the maximum power. It is presumed that the peaks with the maximum power correspond to the position reference signals. In some cases, the true peak in the channel impulse response may lie between two samples. In this case, the "best" peak may be determined by interpolation. The detection circuit 104 then computes the timing of the "best" peak (block 146) and reports the peak/timing estimate to the scheduler (block 148).

Figure 10:
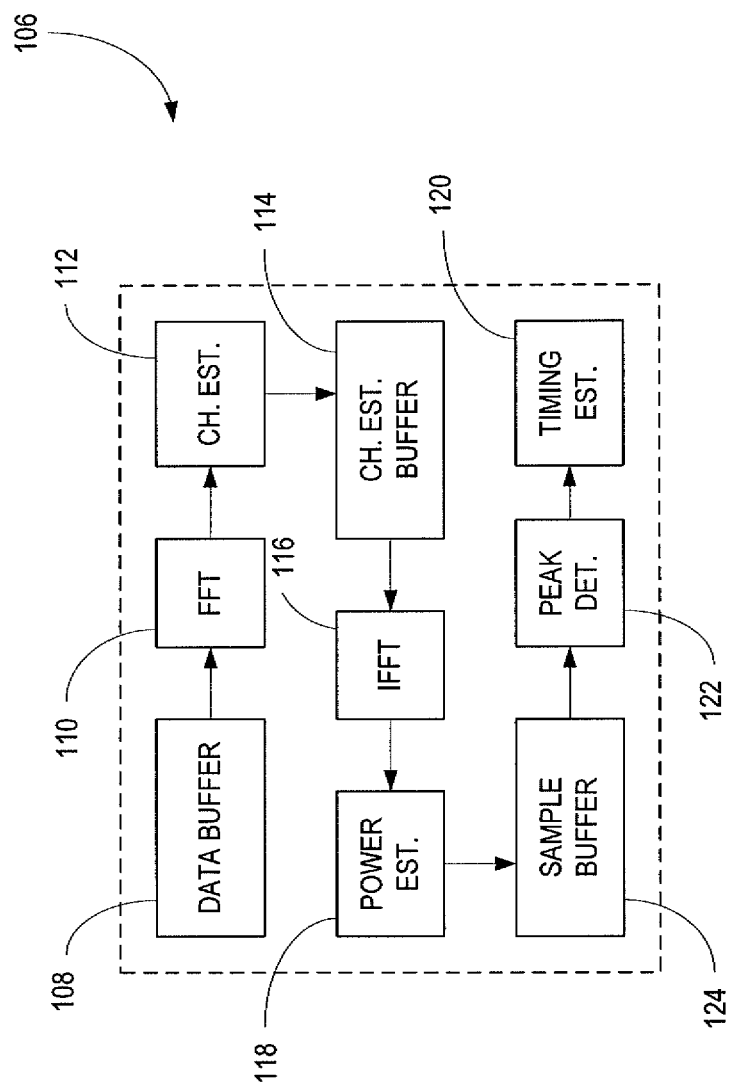
FIG. 10 illustrates the main functional elements of an exemplary reference signal detector.

FIG. 10 illustrates in more detail the main functional elements of the detection circuit 104. As previously noted, the detection circuit 104 comprises a plurality of detectors 106. Only one such detector 106 is shown in FIG. 9. Each detector 106 comprises a data buffer 108, FFT 110, channel estimator 112, channel estimate buffer 114, IFFT 116, power estimator 118, sample buffer 124, peak detector 122, and timing estimator 120. Data received from the cells being monitored is stored in the data buffer 108. FFT 110 converts the data extracted from the data buffer from the time domain to the frequency domain. Channel estimator 112 computes a channel estimate by extracting selected subcarriers from the data and multiplying the selected data by the conjugate of the known position reference signal. The channel estimates output by the channel estimator 112 are accumulated coherently in a channel estimate buffer 114. IFFT 116 generates a channel impulse response from the channel estimates stored in the channel estimate buffer 114. Power estimator 118 computes the power of each sample in the channel impulse response. Power estimates are accumulated non-coherently in the sample buffer 124. Peak detector 122 locates peaks in the channel impulse response by finding samples with the largest power. The timing estimator 120 determines the timing of the position reference signal based on the detected peaks.

Figure 11C:
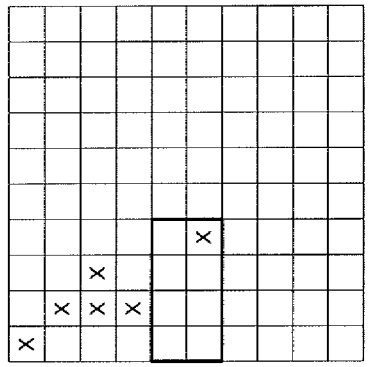
FIGS. 11A-11D illustrate an exemplary operation of the scheduler.
Figure 11D:
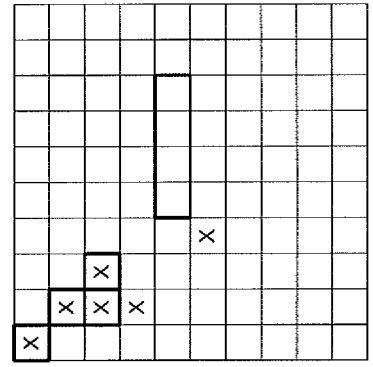
Figure 11A:
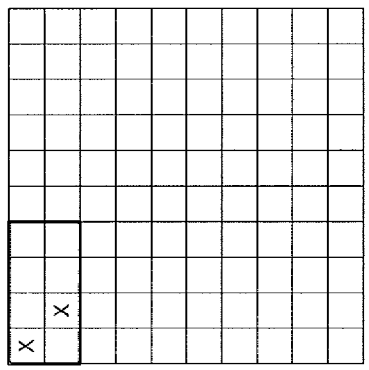
Figure 11B:
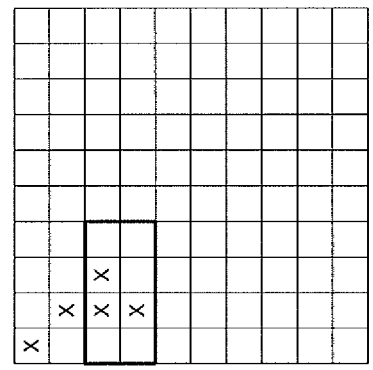

FIGS. 11A-11D illustrate one example of how the hypothesis scheduler 102 operates. The search grids shown in FIGS. 11A-11D show the scheduled hypotheses for four different scheduling intervals. Each element of the search grid represents a timing hypothesis for a given cell. Search grid cells containing "X" represent timing peaks detected by the detection circuit 104. At the start of the search, the scheduler 102 schedules eight hypotheses to be processed in parallel. The scheduler 102 typically arranges the cells 12 in priority order, where the order may depend on assistance information provided by the network, neighbor cell list, or other known information regarding the cells 12. In FIG. 11A, the first four timing hypotheses for the first two cells are scheduled for processing. A peak is detected for both cells at two different hypotheses. In FIG. 11B, the first four timing hypotheses in the next two cells are scheduled. In the third cell, a peak is detected in two adjacent hypotheses so both of them are needed to provide good results. In FIG. 11C, four timing hypotheses for two additional cells are scheduled. For one of the cells, no peak is detected. FIG. 11D illustrates how the results of the search from the earlier scheduling intervals are used to schedule hypotheses for a subsequent search interval. In this case, the scheduler 102 schedules hypotheses in the first three cells corresponding to the previously-detected peaks to track changes in timing. Additionally, the scheduler 102 schedules four new timing hypotheses in the fifth cell to continue acquisition of timing for the fifth cell.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of estimating the arrival time of a received reference signal, said method comprising:
    scheduling, by a scheduler, a first set of timing hypotheses spanning one or more OFDM symbols for one or more cells;
    detecting, by a detector, one or more reference signals corresponding to the first set of timing hypotheses by, for each hypothesis:
        converting one or more OFDM symbols from a time domain into a frequency domain;
        computing channel estimates by correlating one or more frequency domain OFDM symbols with a known reference signal based on said timing hypothesis;
        computing timing based on said channel estimates;
    computing, by said detector, timing estimates based on said detected reference signals;
    reporting, by said detector, said timing estimates for the detected reference signals to said scheduler; and
    scheduling a second set of timing hypotheses based on the reported timing of the detected reference signals.

2. The method of claim 1 wherein computing timing based on said channel estimates comprises:
    computing a channel impulse response based on said channel estimates;
    detecting peaks in said channel impulse response.

3. The method of claim 1 wherein converting one or more OFDM symbols from a time domain into a frequency domain comprises computing a Fourier transform of the received OFDM symbols.

4. The method of claim 1 wherein correlating one or more frequency domain OFDM symbols with a known reference signal based on said timing hypothesis comprises:
    extracting selected subcarriers from said frequency domain OFDM symbols based on said timing hypothesis; and
    multiplying the extracted subcarriers by a conjugate of the reference signal to compute the channel estimate for the selected subcarriers.

5. The method of claim 1 further comprising accumulating channel estimates from two or more frequency domain OFDM symbols in a channel estimate vector for two or more subcarriers.

6. The method of claim 2 wherein computing a channel impulse response based on said channel estimates comprises computing an Inverse Fourier Transform of a channel estimate vector comprising channel estimates for two or more subcarriers.

7. The method of claim 6 wherein detecting peaks in said channel impulse response comprises computing power estimates for a plurality of impulse response samples and detecting peaks based on said power estimates.

8. The method of claim 7 wherein detecting peaks in said channel impulse response comprises iteratively computing power estimates and accumulating said power estimates in a sample buffer.

9. The method of claim 7 wherein detecting peaks in said channel impulse response further comprises interpolating said power estimates to find peaks between impulse response samples.

10. The method of claim 2 wherein computing a channel impulse response comprises:
    computing a channel impulse response for two or more hypotheses; and
    combining the channel impulse responses for two or more hypotheses to obtain a filtered channel impulse response.

11. The method of claim 1 wherein computing timing based on said channel estimates comprises computing phase slope of a channel impulse response; and
    determining timing based on said phase slope.

12. A timing estimation circuit for estimating the arrival time of a received reference signals, said timing estimation circuit comprising a detection circuit and a scheduler:
    said detection circuit being configured to:
        detect reference signals corresponding to a first set of timing hypotheses provided by a scheduler;
        compute timing estimates based on said detected reference signals by, for each hypothesis:
            converting one or more OFDM symbols from a time domain into a frequency domain;
            computing channel estimates by correlating one or more frequency domain OFDM symbols with a known reference signal based on said timing hypothesis;
            computing timing based on said channel estimates;
        report said timing estimates for the detected reference signals to said scheduler; and
    said scheduler being configured to:
        schedule said first set of timing hypotheses so as to span one or more OFDM symbols for one or more cells to be processed by said detection circuit; and
        schedule a second set of timing hypotheses to be processed by said detection circuit based on said reported timing estimates provided by said detection circuit.

13. The timing estimation circuit of claim 12 wherein said detection circuit is configured to compute timing estimates based on said channel estimates by:
- computing a channel impulse response based on said channel estimates;
- detecting peaks in said channel impulse response.

14. The timing estimation circuit of claim 12 wherein said detection circuit is configured to convert one or more OFDM symbols from a time domain into a frequency domain by computing a Fourier transform of the received OFDM symbols.

15. The timing estimation circuit of claim 12 wherein said detection circuit is configured to correlate one or more frequency domain OFDM symbols with a known reference signal based on said timing hypothesis by:
- extracting selected subcarriers from said frequency domain OFDM symbols based on said timing hypothesis; and
- multiplying the extracted subcarriers by a conjugate of the reference signal to compute the channel estimate for the selected subcarriers.

16. The timing estimation circuit of claim 12 wherein said detection circuit is further configured to accumulate channel estimates from two or more frequency domain OFDM symbols in a channel estimate vector comprising channel estimates for two or more subcarriers.

17. The timing estimation circuit of claim 13 wherein said detection circuit is configured to compute a channel impulse response based on said channel estimates by computing an Inverse Fourier Transform of a channel estimate vector comprising channel estimates for two or more subcarriers.

18. The timing estimation circuit of claim 17 wherein said detection circuit is configured to detect peaks in said channel impulse response by computing power estimates for a plurality of impulse response samples and detecting peaks based on said power estimates.

19. The timing estimation circuit of claim 18 wherein said detection circuit is configured to detect peaks in said channel impulse response by iteratively computing power estimates and accumulating said power estimates in a sample buffer.

20. The timing estimation circuit of claim 18 wherein said detection circuit is configured to detect peaks in said channel impulse response further by interpolating said power estimates to find peaks between impulse response samples.

21. The timing estimation circuit of claim 13 wherein said detection circuit is configured to compute a channel impulse response by:
- computing a channel impulse response for two or more hypotheses; and
- combining the channel impulse responses for two or more hypotheses to obtain a filtered channel impulse response.

22. The timing estimation circuit of claim 12 wherein said detection circuit is configured to compute timing based on said channel estimates comprises computing phase slope of a channel impulse response; and determining timing based on said phase slope.

* * * * *

UNITED STATES PATENT AND TRADEMARK OFFICE
CERTIFICATE OF CORRECTION

PATENT NO. : 8,582,698 B2  
APPLICATION NO. : 12/776637  
DATED : November 12, 2013  
INVENTOR(S) : Andgart et al.

Page 1 of 1

It is certified that error appears in the above-identified patent and that said Letters Patent is hereby corrected as shown below:

In the Drawings

In Fig. 7A, Sheet 6 of 12, for Tag "62", in Line 1, delete "HYPOTHESIS J" and insert -- HYPOTHESIS H --, therefor.

In Fig. 9A, Sheet 9 of 12, for Tag "116", in Line 1, delete "HYPOTHESIS J" and insert -- HYPOTHESIS H --, therefor.

In the Specification

In Column 3, Line 47, delete "mobile terminal 12" and insert -- mobile terminal 100 --, therefor.

In Column 4, Lines 12-13, delete "detection circuit 106" and insert -- detection circuit 104 --, therefor.

In Column 5, Line 66, delete "detector 104" and insert -- detector 106 --, therefor.

Signed and Sealed this  
Twenty-second Day of July, 2014

Michelle K. Lee  
*Deputy Director of the United States Patent and Trademark Office*